3,234,083
METHOD OF KILLING FRESH WATER
SNAILS WITH PHENOLS
Eugene E. Kenaga and John L. Hardy, Midland, Mich., assignors to The Dow Chemical Company, Midland, Mich., a corporation of Delaware
No Drawing. Filed Oct. 26, 1964, Ser. No. 406,589
3 Claims. (Cl. 167—31)

The present invention is concerned with the control of schistosomiasis, and is more particularly directed to the disinfestation of bodies of water from populations of snails that serve as alternate hosts for trematode organisms that are the causal agents of schistosomiasis.

In 1852, ten years before his death, the German-trained physician, Theodore Bilharz, first published his discovery, made a year earlier in Cairo, that from the mesenteric vein of an Egyptian he had recovered certain "worms" that on morphologic characteristics and from what he knew of habitat, he named *Distoma haematobium*. In later work Bilharz established that the endemic hematuria of the fellaheen was caused by this organism, as were the viable eggs sometimes recovered from urine.

The nomenclature of Bilharz yielded in 1858 to the revision of Weinland; and Bilharz's Distoma was assigned its present place in the genus Schistosoma. However, the pathologic syndrome consequent upon invasion of the mammalian host by a blood fluke was already well known as bilharziasis in the medical profession. Thus, when, on egg characteristics, in 1864, Harley distinguished the causal organism of South African haematuria from Bilharz's fluke, he named it *Bilharzia capensis*.

Later, other trematodes, including other representatives of Schistosoma, were found to cause diseases in which the blood stream is involved only much more remotely: these are known as forms of schistosomiasis while the term bilharziasis tends to be used decreasingly, and to be reserved for the blood fluke diseases. However, the two terms are not mutually exclusive and tend to be synonymous. In this specification they are assumed to be synonymous.

Other terms more or less synonymous include bilharziosis and bilharzia infection.

The world over, the group of parasitic diseases named together as schistosomiasis is second only to malaria as the most serious of parasitic diseases of human beings and economic animals. In a 1914 study, more than half of 30,000 Egyptians examined were found to carry the disease. Under such names as "liver fluke," schistosomiasis is a serious disease of domestic animals, such as dairy cattle, dogs, and the like.

In recent years, great progress has been made in the control of internal parasites of warm blooded animals by the use of systemic parasiticides which are essentially harmless to the animals. Thus, today, it is commonplace to medicate cattle with certain insecticides which are harmless to warm blooded animals but completely disinfest the animal of the parasitic larval phases of certain insects. In the control of the trematodes, however, the problem is more complicated. Trematodes are not insects. Typically, trematodes are not affected by pesticides which easily and completely disinfest animals of insect parasites. Further, the mammalian phase of the fluke life cycle is very long-lived. Spans of twenty years have been recorded.

In 1918, tartar emetic (potassium antimony tartrate) was found to be of use in treatment of uncomplicated Schistosoma parasitization that had not seriously involved the urinary tract and it is used somewhat to the present day. However, toxic side effects are often serious, and better therapeutants are needed. Sodium antimony tartrate, other antimony-organic compounds, such as lithium antimony thiomalate; and, more recently 1-methyl-4-β-diethyl-aminoethylaminothioxanthone hydrochloride have been used. None is fully effective and all produce toxic side effects so serious as not always to be tolerable.

Reasoning by analogy from other related organisms, in 1864 Harley and Cobbold expressed the belief that Schistosoma had an alternate host phase, and that some mollusc served as alternate host. Epidemiological studies strongly corroborated this belief in the 1890's. Early in the present century Miyairi, in Japan, had established experimentally that a mollusc was the alternate host of another closely related schistosome. Work in Egypt by Leiper in 1915, based upon Miyairi's, incriminated Bulinus (synonym: Isidora) and Planorbis. Since this discovery, great emphasis has been placed upon control of the alternate host.

The taxonomy of the Gastropoda generally is not a settled matter. Until recently, shell, or shell and operculum characteristics have provided the most common basis for determination. However, recently, studies of internal structures including notably the radula, heart, and reproductive organs, have provided some important distinctions. Hence, the nomenclature in any list of alternate hosts for Schistosoma and related trematodes is somewhat uncertain.

Planorbis and Bulinus are consistently incriminated. In at least some species, Bulinus may be known as Isidora: in others, as Pyrgophysa. Biomphalaria is essentially synonymous with Planorbis. Lymnaea and Melania have been reported alternate hosts. Some recent writers classify some of the Lymnaea, the common pond snails, as Pseudosuccinea, others as Acella, yet others as Radix and others as Bulimnaea. Nosophora is a serious pest in Japan. Australorbis and Tropicorbis are carriers also; and, experimentally, Drepanotrema has been proved capable of acting as carrier. Authorities agree that snails of species not yet recognized as vectors probably function thus.

In any research upon agents to kill snail hosts of schistosomiasis, it is desired to avoid, and in some places it is unlawful, to propagate or release such snail vectors. The well being of those working with them is constantly threatened.

The World Health Organization has stated ("mol/inf/15" April 10, 1964, page 5) that the non-vector Helisoma ("ramshorn snail") is a test snail of choice. Response of this snail to molluscicides is regarded as valid: its culture is essentially harmless. The snail is widely distributed in waters, usually still waters, of the north temperate zone.

Terrestrial snails and marine snails have not been incriminated. Thus, the problem is in the control of aquatic and amphibious snails of fresh, including non-marine brackish, water.

A typical life cycle of a trematode is discussed in "Living Agents of Disease" (Putnam, New York, 1952), by Culbertson and Cowan; see page 121 and following as well as elsewhere in the book. See also "Human Helminthology" (Lea & Febiger, Philadelphia, 1949), by Faust, pages 72 and following.

Typically, the trematode infecting a warm blooded animal, which may be man, matures and lays eggs which are characteristically voided in the host urine or feces or both, and, in water, hatch into a ciliated form which is known as a "miracidium," and, although distinctively structured, is of microscopic size. This miracidium must, if it is to survive, within less than about two days, invade the body of a snail.

Miracidia of some, and perhaps all, trematodes are believed to enjoy considerable latitude as to the particular species to act as satisfactory alternate host. Within the body of the snail, after passing through various characteristic forms, the trematode metamorphoses to evolve the cercarial form. In this form, it may leave the body of the snail host to swim free in environing water and penetrate the skin of a warm blooded animal with which it comes in contact. Invasion occurs only upon a few seconds contact and is usually unnoticed. In the form of the cercariae, then, the trematode can, and does, infest human beings and domestic animals which bathe, drink or carry out laundry operations, or wade in or otherwise contact water in connection with agricultural operations. In each life phase, trematode species appears to have host preferences, and in at least some trematodes they tend to be nearly obligate.

Cercariae which do not leave the alternate host to enter the warm blooded animal host may become encysted, in which form they are called metacercariae, and in this form may remain in the body of the mollusc alternate host over extended periods of time. In at least some schistosomes, the metacercarial cysts may occur in aquatic vegetation. "Trapa," especially "Natans," is commonly infested and, when eaten raw as is not uncommon in the Orient, may convey the parasite to the warm-blooded host. The metacercariae apparently can infest the warm-blooded animal host only if ingested alive by a warm-blooded host within which it then lives. Once established, the trematode in its warm-blooded host is very long-lived. Some are said to have lived twenty years, and quite probably the trematode lives as long as does its host, whose life may be shortened by the parasite.

Not only do known systemic insecticides fail to control the trematode within the body of the warm blooded animal host, but also insecticides applied at typical insecticidal rates usually fail completely to control the snail in its aquatic or partially aquatic environment. Tests under laboratory conditions have established that, at ordinary rates suitable for practical use, there is no known correlation between insecticidal activity and snail-killing activity. See the WHO bulletin mentioned earlier.

Thus, to the present time, active investigation has been encouraged by leading health agencies into the finding of means which will satisfactorily depopulate natural bodies of water of alternate host snails with a minimum effect or none upon fish, aquatic and littoral plants and with ready degradation of any chemical agent employed so that a short time after performing its necessary work, such treating substance disappears from the treated water. Moreover, during the time of most active treatment, at rates effective for control of snails, the substance should be essentially harmless to warm blooded animals. Where economically desirable insects are involved, and especially economic insects with an aquatic phase, it may be very desirable that at employed rates, times, and concentrations a molluscicide not be an insecticide. Such desired insects include various of the Odonata and, of course, honeybees, which drink from bodies of water.

We have now discovered that compounds of the formula

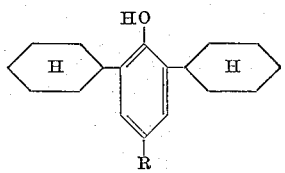

wherein R is a member of the group consisting of chloro, bromo, and alkyl of from 1 to 5, both inclusive, carbon atoms; and also the water soluble salts thereof, including the ammonium, alkali metal salts, loweralkylamine salts, and loweralkanolamine salts are highly toxic at very low concentrations to snails but, at effective snail killing rates, have minimal side effects of any kind. Loweralkylamine and loweralkanolamine are used to designate primary, secondary, or tertiary amines of from 1 to 5, carbon atoms per alkyl or hydroxyalkyl groups.

It will be apparent that the present compounds are all 2,6-dicyclohexyl, 4-halo- or 4-loweralkylphenols or salts of such phenols, the definition of halo being limited.

Within the indicated genus, and for purposes of the present invention, the halo- or alkyl-dicyclohexylphenoxy moiety is apparently the functional portion of the molecule and the identity of the salt may be selected from within the indicated group purely for convenience in formulation and exhibition of the useful properties of the compounds. For instance, the alkali metal salts and loweralkanolamine salts are more soluble in water than the unreacted phenol.

When it is desired to kill snails with the lowest possible concentration of active toxicant, it is preferred to employ a compound of the present genus wherein R is a member of the group consisting of methyl and isopropyl; such substances have the highest specific activity against snails of any phenolic substance now known to the inventors to be a molluscicide; when it is acceptable to sacrifice some modest amount of high specific snail toxicity to achieve greater selectivity in favor of fish and other aquatic life while yet retaining good control of snails, R is preferably a member of the group consisting of ethyl and chloro: for maximum fish safety, R is chloro. When neither of these considerations is controlling and no other basis for a distinct preference exists, the toxicant to be employed may be any substance of the present group, whether in pure or impure form and whether the impurities, if any, are other members of the present genus.

The phenol substances to be employed according to the present invention are known compounds. Note U.S. Patent 2,802,881 and 2,804,481. See also Chemical Abstracts, volume 21 (1927), pages 2463 and 2464.

In carrying out the present invention, any technique may be used so long as a snail of a kind dependent upon a body of water is contacted with a toxicant of the present invention at a concentration, and for a period of time both sufficient that the snail dies as a result of the said contact. A snail is regarded herein as dependent upon a body of water if it is aquatic or amphibious.

Preferably, the snail is contacted with the toxicant by introducing the toxicant into the body of water that is necessary to the snail. When it is desired to depopulate the water of snails for an extended period of time, it will be desired to repeat the introduction of the toxicant at intervals as snails or snail eggs are brought in; or maintain the toxicant at a low, molluscicidal level of concentration. Such maintained low levels are conveniently caused to persist by dispersing the toxicant in water in the form of pellets prepared with water-insoluble, or slowly-soluble, carrier material which disperses, dissolves, or yields the toxicant slowly by leaching to the water over a period of time.

Concentrations to be employed in water vary, depending upon many factors not all of them known, including water temperature, snail species, expected or known duration of snail contact with treated water, nature and content of organic matter in, or in contact with, the water, if any; incidence of sunlight, daylight length and other seasonal factors. In general, good results are obtained in still water when a concentration of from 0.05 to about 5 parts toxicant, free phenol basis, per million parts water, all by weight, are employed. When it is desired to obtain a quick kill of the snails, as may be necessary in rivers and streams with moderate to rapid current, higher concentrations up to as high as 25, 50, or 100 parts toxicant per million parts water, by weight, can be employed. When a quiescent body of water is to be treated, under relatively warm water temperature conditions (water above 80° F. at the surface, for example) and prolonged contact is possible, concentrations maintained as low as 0.01 part toxicant per million parts water can be used, with contact durations as great as several weeks.

Under field conditions, concentrations typically employed are on the order of 0.25–1.5 parts toxicant, free phenol basis, per million parts water, all by weight.

It is not necessary to know the weight of water in a body of water in order to achieve the desired concentrations, although under primitive conditions wherein schistosomiasis is the most severe problem, this may be the most convenient method. Alternatively, simple, standardized chemical tests can be carried out during the course of addition of toxicant to water, and thereafter during such period as toxicant concentration is to be maintained, and further toxicant supplied until at least the desired concentration is achieved. Moreover, snails, even truly aquatic fresh water snails, tend to live in only shallow waters or in the upper parts and near the shores of deeper waters: hence, dispersion of toxicant uniformly is not essential.

When it is desired as it often will be, to effect control of such snails with minimum of side effects upon other components of the entire biota, and in particular to avoid harm to fish, littoral plants, warm blooded animals, and the like, then the combination of concentration of toxicant and exposure time, will be chosen to represent a minimum molluscicidal dosage. In standing bodies of water with little or no inflow and outflow, it is possible to control the concentration, but duration of exposure will depend upon time elapsed until reaction and precipitation, together with biodegradation and other factors, have detoxified the water; this will, in turn, depend upon many local natural factors. In running bodies of water of which the current moves at a known rate, the duration of exposure at an initial site can be controlled with a fair degree of accuracy.

Known techniques for the chemical treatment of bodies of water can be used, making use of the known solubilities, dispersibilities, and the like, of the toxicant substances.

When, through tidal action, drainage, control of dam spillways and the like, the snails are exposed in an abnormal way, the wet exposed land bearing a snail population can be sprayed or dusted with formulations prepared as for routine agricultural application.

More particularly, the alkali metal, ammonium, and certain loweralkylamine and loweralkanolamine salts are readily dispersible in water and can be distributed in, or over, the water or wet land to be treated, in the form of a dust, of either the pure toxicant or the toxicant admixed with a diluent or other water treatment substance whereby to increase its bulk and ease of distribution in measured quantities that are small with respect to the quantity of water. Such diluent solid can be an inert substance such as infusorial earth, clay, talc, chalk, wood flour, or the like. The toxicant can be distributed in this kind of substance by grinding toxicant and diluent together, or by grinding them separately and admixing, by dispersing toxicant in a liquid which is then dispersed in the solid with subsequent grinding after the liquid has been evaporated, if desired.

As carrier in coarsely particulate form adapted for slow release of toxicant a porous fritted glass, or a porous fired clay can be used, into which by solvent solution the toxicant is dispersed, solvent being thereafter removed by vaporization. Other such carriers are known.

Also the toxicant can be dissolved in water or organic solvent; in either case, but especially in the case of organic solvent, a wetting agent as emulsifying dispersant can be added. Such preparations are adapted for prompt and often spontaneous dispersion when added to water, as an emulsion of toxicant in water. For convenience in measuring out an employed amount, such preparation can be diluted with further organic liquid, or with water; or for convenience in shipment and storage, can be prepared as a concentrate in which the contained amount of toxicant approaches the theoretical maximum for the solvent-dispersant system employed. At dam spillways and the like, such high concentrations can be directly employed, relying upon water turbulence for mixing.

The quantity of toxicant per unit of preparation is not critical; so long as the preparation can be employed to distribute the toxicant in necessary amounts in the body of water to be treated, good results are obtained.

The following examples represent the best methods now known to practice the present invention.

Example 1

A composition of a compound of the present invention is prepared for molluscicidal use. The toxicant substance is dissolved in approximately the smallest amount of acetone in which it is soluble, the acetone having dissolved in it also a small amount of surface active dispersing agent. The acetone solution of toxicant and surface active agent is then dispersed in water to prepare an aqueous stock dispersion containing the toxicant in the concentration of 500 parts toxicant per million parts water. This stock dispersion is then diluted with further water to obtain a concentration of toxicant in water at which the action of toxicant is to be employed.

An identical preparation is prepared except that no candidate toxicant compound is employed: the acetone and wetting agent are dispersed in water at a concentration approximately five times as great as the concentration of the same that would be present when employing the least acetone-soluble substance to be used as toxicant, at the greatest concentration at which it is to be used; in other words, at five times the normal maximum concentration of these non-toxicant substances. This is used as a check to ascertain what, if any, mollusc mortality is caused by the solvent and wetting agent. It is ascertained that, at the indicated concentration, approximately five times a normal working maximum, they are without evident effect of any kind upon snails of the genus Helisoma. This is taken to indicate that in the present examples, toxic effects upon snails can be assumed to be caused only by toxicant compounds present.

Example 2

2,6 - dicyclohexyl - 4-methylphenol (synonym: 2,6-dicyclohexyl-p-cresol) was dispersed in water as sole toxicant in the manner indicated in Example 1 to obtain water having the said compound at various concentrations. The water was placed in open vessels under conditions favorable to the general growth and well-being of snails. Into each vessel was placed a counted population of individual snails, along with fish, and Daphnia spp. ("water fleas"), to simulate the aquatic fauna of a natural body of water. The water was maintained for three days and then observations made, including counts of snails dead, if any. Snails not dead but not evidently healthy were held for further periods of time to ascertain ultimate mortality. The tests were conducted at numerous concentrations of toxicant and it was ascertained that the concentration of toxicant in water that was lethal in 3 days under employed conditions to 50 percent of the snail population (hereinafter referred to as $LC_{50}$) was 0.4 part toxicant per million parts ultimate aqueous composition, all parts by weight (hereinafter referred to as p.p.m.). The $LC_{95}$ was ascertained to be 0.8 p.p.m.

With this toxicant, the $LC_{50}$ values for goldfish and for Daphnia were found to be 0.6 p.p.m.

Example 3

Essentially the procedures of Example 2 were repeated except that the sole toxicant compound employed was 2,6-dicyclohexyl-4-isopropyl phenol. In this method, the $LC_{50}$ for the snails was found to be 0.35 p.p.m., and the $LC_{95}$ was found to be 0.55 p.p.m. For goldfish the $LC_{50}$ and $LC_{95}$ values were the same as for the snails. Daphnia was somewhat more resistant to the compound, the $LC_{50}$ and $LC_{95}$ being, respectively, exactly twice the value for goldfish or snail.

Essentially the same procedures are followed, employing the sodium salt of 2,6-dicyclohexyl-4-isopropylphenol, and calculating concentration upon the free phenol basis. The compound can be dissolved in water without first dispersing in acetone. The toxicity is essentially the same as that of the free phenol. Essentially the same results are obtained when employing the potassium salt.

*Example 4*

Essentially the procedure of Example 1 was repeated but employing as sole toxicant 4-ethyl-2,6-dicyclohexylphenol. The $LC_{50}$ for this compound was ascertained to be 0.85 p.p.m. and the $LC_{95}$, 1.2 p.p.m. for snails. In contrast, goldfish were unaffected at concentrations of 5 p.p.m., there being no mortality or morbidity evident among them.

*Example 5*

Essentially the procedures of Example 1 were repeated, employing as sole toxicant 4-chloro-2,6-dicyclohexylphenol. The $LC_{50}$ for snails was 0.85 p.p.m. and the $LC_{95}$ was 1.2 p.p.m. In contrast, goldfish were unaffected at concentrations of 5 p.p.m.

*Example 6*

Essentially the procedures of Example 1 were repeated, the test fish being selected as having higher oxygen demand than goldfish; guppies were employed. It was ascertained that at the snail $LC_{95}$ of 1.2 p.p.m. guppies were unaffected; mortality of guppies was first noted at 2 p.p.m.

*Example 7*

Essentially the procedures of Example 1 were repeated, but snail eggs laid during the three-day exposure period in the various treated waters were maintained for 12 days under conditions favorable to growth for a period of time to ascertain the $LC_{50}$ and $LC_{95}$ for eggs. It was ascertained that these values were essentially the same for snail eggs laid by snails in the toxicant-bearing water as for the adult snails.

In essentially the same procedures, the $LC_{50}$ and $LC_{95}$ values for eggs were ascertained for the toxicants of Examples 3, 4, and 5, and in each case the egg mortality and adult mortality were essentially the same.

*Example 8*

In procedures essentially the same as the foregoing it is ascertained that, when toxicant compound is supplied to treated water in an amount calculated upon the free 2,6 - dicyclohexyl - 4 - (substituted)phenoxy moiety, snail toxicities of the same order are manifest by 4-bromo-2,6-dicyclohexylphenol, the sodium salt of 4-bromo-2,6-dicyclohexylphenol, the dimethylamine salt of 4-bromo-2,6-dicyclohexylphenol, the trimethanolamine salt of 4 - bromo - 2,6 - dicyclohexylphenol, 4 - chloro - 2,6-dicyclohexylphenol, the sodium salt of 4 - chloro - 2,6-dicyclohexylphenol, the diethylamine salt of 4-chloro-2,6-dicyclohexylphenol, the monoethanolamine salt of 4 - chloro - 2,6 - dicyclohexylphenol, the ammonium salt of 4 - chloro - 2,6 - dicyclohexylphenol, 2,6 - dicyclohexyl - 4 - methylphenol (synonym: 2,6-dicyclohexyl-p-cresol), the potassium salt of 2,6-dicyclohexyl-p-cresol, the monopropylamine salt of 2,6-dicyclohexyl-p-cresol, the triethanolamine salt of 2,6-dicyclohexyl-p-cresol; 2,6-dicyclohexyl-4-tertiary butylphenol, the isobutylamine salt of 2,6-dicyclohexyl-4-tertiary butylphenol, the dibutanolamine salt of 2,6-dicyclohexyl-4-pentylphenol, and the triisobutylamine salt of 2,6-dicyclohexyl-4-isopentylphenol.

We claim:

1. Method of killing a fresh-water snail that is dependent upon a body of water which comprises the step of contacting the snail with a molluscicidal amount of a toxicant selected from the group consisting of a compound of the formula

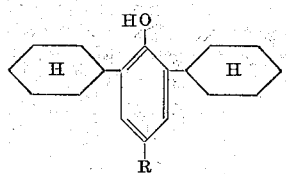

wherein R is a member of the group consisting of chloro, bromo, and alkyl of from 1 to 5, both inclusive, carbon atoms; and the water soluble salts thereof.

2. Method of claim 1 wherein the contacting is carried out by dispersing the toxicant in the body of water upon which the snail is dependent.

3. Method of claim 2 wherein the toxicant is supplied in an amount sufficient that the water contains at least 0.1 part toxicant, free phenol basis, per million parts water, all by weight.

References Cited by the Examiner

UNITED STATES PATENTS

| | | | |
|---|---|---|---|
| 2,802,881 | 8/1957 | Reckert | 167—31 |
| 2,804,481 | 8/1957 | Reckert | 167—31 |

FOREIGN PATENTS

| | | |
|---|---|---|
| 807,328 | 1/1959 | Great Britain. |

JULIAN S. LEVITT, *Primary Examiner.*